Patented Nov. 10, 1931

1,831,212

UNITED STATES PATENT OFFICE

JULIUS VOSS AND WALTER SPIETSCHKA, OF WIESBADEN-BIEBRICH, GERMANY, ASSIGNORS TO KALLE & CO., AKTIENGESELLSCHAFT, OF WIESBADEN-BIEBRICH, GERMANY, A CORPORATION OF GERMANY

SHRINKABLE CAPSULE AND PROCESSES FOR MAKING IT

No Drawing. Application filed November 8, 1927, Serial No. 231,985, and in Germany July 28, 1926.

The present invention relates to shrinkable cellulose capsules and a process of making them.

In the manufacture of capsules which are to be applied to bottles or other receptacles by shrinkage, the forms for shaping the capsules are usually dipped into a viscose solution and the coating adhering to the said forms is treated with a cold precipitating agent. After this precipitation, the pellicles so produced are stripped from the form. The capsules are thereby easily damaged owing to the low pressure produced inside the capsule during this operation so that generally folds and cracks are formed on the capsules.

Now we have found that the operation of detaching the capsules from the forms can be performed very easily and without causing the formation of folds on them by treating the capsules, while they are on the form, with a hot bath. For this purpose the precipitating baths may be kept warm from the beginning or there may be used cold precipitating-baths and the forms subsequently dipped into boiling water. By properly choosing the temperature for the precipitation, the process may be carried out in such a manner that the capsules are either stripped from the forms by hand or that they come off automatically from the forms. In choosing the suitable temperature of the bath, which may vary between 40° C. and 100° C., the temperature must, as a general rule, be the higher the more alkali is contained in the viscose.

Our process may be illustrated by the following examples:

1. A cylindrical hollow body is dipped into a viscose solution of ordinary composition, the said form is then placed into a bath heated to 45° C., containing 20% of ammonium sulfate and 1% of sulfuric acid. As soon as the viscose becomes decomposed, which occurs after about 10 minutes, the form is sprinkled over with cold water whereupon the capsules can be easily drawn off the forms without there being any formation of folds thereon.

2. The form covered with viscose is dipped into a bath heated to 80° C. containing 10% ammonium sulfate and 0.4% of sulfuric acid. After 10 minutes, the capsules have come off from the form and float freely on the surface of the precipitating bath.

3. The form covered with the viscose is dipped into an acid solution of ammonium sulfate and, when the precipitation is complete, the form is placed into boiling water. Within a few seconds the capsule is forced off the form of the steam pressure produced in its interior part and floats on the surface of the water. Instead of water, there may be used with equal success any other hot liquid, for instance a salt solution.

4. A hollow body is dipped into viscose, and after this form has been taken out of the solution, the excess of the viscose is allowed to run off; the form is then placed for 7 minutes in a bath heated to 20° C. and containing 20% of ammonium sulfate and 0.5% of sulfuric acid and is then again placed for 10 minutes into a bath containing 10% of ammonium sulfate and 0.5% of sulfuric acid and kept at a temperature of 40–50° C. The capsules are then sprinkled over with cold water whereupon they can be easily detached from the form without there being any formation of folds thereon.

We claim:

1. In a process of making shrinkable cellulose capsules comprising coating a form with viscose and treating the viscose coating with a precipitating bath: the step of treating the coating on the form during precipitation with a bath having a temperature of at least 40° C.

2. In a process of making shrinkable cellulose capsules comprising coating a form with viscose and treating the viscose coating with a precipitating bath: the step of treating the viscose coating on the form with a feebly acid precipitating bath heated to a temperature between 40° C. and 100° C. until the cellulose has been regenerated.

3. In a process of making shrinkable cellulose capsules comprising coating a form with viscose and treating the viscose coating with a precipitating bath, the step of treating the viscose coating on the form with a precipitating bath feebly acidified by means of sulfuric acid and heated to a temperature between 40° C. and 100° C. until the cellulose has been regenerated.

4. A process of manufacturing shrinkable cellulose capsules which comprises coating a form with viscose, treating the viscose coating for some time with a precipitating bath feebly acidified by means of sulfuric acid heated to 20° C. and containing 20% of ammonium sulfate and then for some time with a precipitating bath feebly acidified by means of sulfuric acid and heated to 40° C. to 50° C. and containing 10% of ammonium sulfate, and finally sprinkling the capsule thus formed with cold water.

In testimony whereof, we affix our signatures.

Dr. JULIUS VOSS.
Dr. WALTER SPIETSCHKA.

ture between 40° C. and 100° C. until the cellulose has been regenerated.

4. A process of manufacturing shrinkable cellulose capsules which comprises coating a form with viscose, treating the viscose coating for some time with a precipitating bath feebly acidified by means of sulfuric acid heated to 20° C. and containing 20% of ammonium sulfate and then for some time with a precipitating bath feebly acidified by means of sulfuric acid and heated to 40° C. to 50° C. and containing 10% of ammonium sulfate, and finally sprinkling the capsule thus formed with cold water.

In testimony whereof, we affix our signatures.

Dr. JULIUS VOSS.
Dr. WALTER SPIETSCHKA.

---

CERTIFICATE OF CORRECTION.

Patent No. 1,831,212.

Granted November 10, 1931, to

JULIUS VOSS ET AL.

It is hereby certified that error appears in the above numbered patent requiring correction as follows: In the grant and in the heading to the printed specification, title of invention, for "Shrinkable Capsules and Processes for Making Them" read Shrinkable Capsules and a Process for Making Them; page 1, line 3, after "them" insert For which applications have been filed in Germany in July 28, 1926, same page, line 58, for "of" read by; and that the said Letters Patent should be read with these corrections therein that the same may conform to the record of the case in the Patent Office.

Signed and sealed this 21st day of June, A. D. 1932.

(Seal)

M. J. Moore,
Acting Commissioner of Patents.

CERTIFICATE OF CORRECTION.

Patent No. 1,831,212. Granted November 10, 1931, to

JULIUS VOSS ET AL.

It is hereby certified that error appears in the above numbered patent requiring correction as follows: In the grant and in the heading to the printed specification, title of invention, for "Shrinkable Capsules and Processes for Making Them" read Shrinkable Capsules and a Process for Making Them; page 1, line 3, after "them" insert For which applications have been filed in Germany in July 28, 1926, same page, line 58, for "of" read by; and that the said Letters Patent should be read with these corrections therein that the same may conform to the record of the case in the Patent Office.

Signed and sealed this 21st day of June, A. D. 1932.

(Seal)

M. J. Moore,
Acting Commissioner of Patents.